United States Patent [19]

Jiang et al.

[11] Patent Number: 5,695,637

[45] Date of Patent: Dec. 9, 1997

[54] COMBINATION FULL FLOW AND BYPASS FILTER WITH VENTURI NOZZLE

[75] Inventors: Zemin Jiang; Ted S. Loftis; Dwight S. Suiter, all of Cookeville; Erika B. Motlow, Sparta; Mike B. Lanius, Baxter; Sargeon Billy Hedgecough, Cookeville, all of Tenn.

[73] Assignee: Fleetguard, Inc., Nashville, Tenn.

[21] Appl. No.: 699,713

[22] Filed: Aug. 27, 1996

Related U.S. Application Data

[63] Continuation of Ser. No. 405,387, Mar. 15, 1995, abandoned, which is a continuation of Ser. No. 84,875, Jun. 30, 1993, abandoned.

[51] Int. Cl.$^6$ ................................................ B01D 35/26
[52] U.S. Cl. ................... 210/316; 210/416.5; 210/438; 210/440; 210/442; 210/DIG. 13
[58] Field of Search ........................... 210/168, 314, 210/316, 416.1, 416.5, 438, 440–444, DIG. 13, DIG. 17

[56] References Cited

U.S. PATENT DOCUMENTS

| | | | |
|---|---|---|---|
| 2,843,268 | 7/1958 | Kennedy | 210/295 |
| 4,655,914 | 4/1987 | Wada | 210/168 |
| 4,738,776 | 4/1988 | Brown | 210/168 |
| 4,885,082 | 12/1989 | Cantoni | 210/90 |

FOREIGN PATENT DOCUMENTS

| | | |
|---|---|---|
| 0287527 | 10/1988 | European Pat. Off. . |
| 573427 | 2/1958 | Italy . |
| 561987 | 6/1944 | United Kingdom . |
| 860871 | 2/1961 | United Kingdom . |

*Primary Examiner*—Matthew O. Savage
*Attorney, Agent, or Firm*—Woodard, Emhardt, Naughton Moriarty & McNett

[57] ABSTRACT

A combined full flow and bypass oil filter for internal combustion engines includes a generally cylindrical filter body and a generally cylindrical filter head which is threadedly attached to the filter body. The filter head includes an inlet and an outlet and the flow path between the inlet and outlet extends through the filter body. Disposed within the filter body is a generally cylindrical and hollow full flow filtering element and a generally cylindrical and hollow bypass filtering element. The incoming flow of lubricating oil passes through the outer diameter surfaces of the full flow and bypass filtering elements and exits from these filtering elements through their hollow interiors. Concentrically positioned in the exiting flow path of the full flow filter is a Venturi nozzle which creates a low pressure zone. An outlet flow conduit is disposed in flow cooperation with the exiting oil flow through the bypass filtering element and the exit opening of this flow conduit extending from the bypass filtering element is positioned within the low pressure zone of the Venturi nozzle. The pressure differential across the two filtering elements creates a forced flow through the bypass filtering element and the filtered oil through both elements combines as part of a single flow loop.

3 Claims, 11 Drawing Sheets

COMBINATION FULL FLOW AND BYPASS FILTER WITH VENTURI NOZZLE

This application is a continuation of U.S. patent application Ser. No. 08/405,387, filed on Mar. 15, 1995, now abandoned, which was a continuation of U.S. patent application Ser. No. 08/084,875, filed on Jun. 30, 1993, now abandoned.

BACKGROUND OF THE INVENTION

The present invention relates generally to fluid filtration components and systems for internal combustion engines, gasoline and diesel, and related devices which require fluid filtration. More particularly the present invention pertains to lubricating oil filtration employing both full flow filtration and bypass filtration.

Internal combustion engines generally employ two types of filtration in order to clean the lubricating oil. These two types of filtration are commonly referred to as full flow filtration and bypass filtration. Full flow filtering elements receive and filter (relatively coarsely) 90–100% of the regulated oil pump output prior to supplying the oil to the engine components. Bypass filters typically receive only 5–10% of the pump output and are generally effective to "superclean" the oil. Most modern engines (gasoline and diesel) employ full flow filters. Heavy duty engines (particularly diesel) are often equipped with bypass filters in addition to full flow filters. Historically, engines achieve combined full flow and bypass filtration by one of three methods.

One method of creating combined full flow and bypass filtration is to place the full flow and bypass filtering elements in separate containers and provide separate, individual flow circuits with a positive means of forcing flow through the bypass filter. A second method of achieving combined full flow and bypass filtration is to place the full flow and bypass filtering elements in the same container with separate, individual flow circuits and with a positive means of forcing flow through the bypass filter. A third method involves placing the full flow and bypass filtering elements in the same, single container but with a single flow circuit and without any positive means of forcing flow through the bypass filtering element.

The present invention provides a design which permits combined full flow and bypass filtration in the same, single container, with a single engine oil flow circuit and with a positive means of establishing flow through the bypass filter. In the present invention this "positive means" is a driving (suction) force as will be described hereinafter.

The key of the present invention is the use of a nozzle in conjunction with a combination full flow and bypass filter. A narrow throat nozzle is inserted into or combined with the filter outlet and this nozzle utilizes the full flow fluid to create both a high speed flow area and a low pressure zone. The bypass filter outlet is placed in the nozzle throat (the low pressure zone) and it is the preciseness and nature of this placement which creates the desired flow for the present invention.

The full flow filtering element and the bypass filtering element share a common inlet which results in a common upstream pressure zone. However, the bypass outlet is placed in the nozzle such that its outlet or exit coincides with the low pressure zone. This causes the bypass filtering element to have a lower downstream pressure than that of the full flow filtering element. As a consequence of the pressure differential across the bypass filtering element being greater than the pressure differential across the full flow filtering element more flow is drawn through the bypass filtering element compared to similar filtering arrangements which do not employ the nozzle design of the present invention. The desired flow rate through the bypass filter can be obtained by varying the design and the dimensions of the nozzle and of the bypass filter outlet.

The design of the present invention eliminates the conventional second flow circuit used for separating bypass and full flow oil. This flow circuit elimination greatly reduces both the internal and external plumbing on the engine thereby dramatically reducing cost. By the present invention, the bypass oil flow that was conventionally returned to sump is now fed directly to the engine components that require clean, pressurized oil. One economic advantage of this design is a reduction in the parasitic power loss (oil is no longer pumped expressly for bypass filtration). A second economic advantage is that the oil supplied to the engine is cleaner than with prior systems in that the bypass oil is now fed directly to lubricated components (the bypass oil does not return to sump) which results in less engine wear and longer engine life.

An additional benefit of the present invention is that it provides a relatively inexpensive means of adding bypass filtration to engines formerly utilizing only full flow filtration. Prior to the invention, the addition of a force driven/drawn bypass required the addition of a new flow circuit either internal or external to the engine. It also required the engine to have ample pump output margin to allow parasitic bypass flow. Due to the great expense to make engine changes when a bypass circuit is added internal to the engine, it can be seen why the present invention has made such a significant improvement. Even with a bypass circuit addition which is external to the engine, this may involve an extra filter container and expensive plumbing in addition to requiring mounting space. As indicated, the present invention enables bypass filtration without either additional plumbing or additional flow circuitry.

Several patents currently exist with oil filtering designs which to some limited extent may be regarded as relevant to a consideration of the present invention. The following listed patents provide a sampling of earlier oil filtration designs and provide an appropriate analysis of earlier concepts prior to discussing the specific details of the present invention.

| Patent | Patentee | Date Issued |
|---|---|---|
| 2,843,268 | Kennedy | July 15, 1958 |
| 4,655,914 | Wada | Apr. 7, 1987 |
| 4,738,776 | Brown | Apr. 19, 1988 |
| 4,885,082 | Cantoni | Dec. 5, 1989 |
| 0 287 527 | Cantoni-European | Oct. 19, 1988(published) |
| 860,871 | United Kingdom | Feb. 15, 1961(published) |
| 573427 | Italy | Feb. 26, 1958 |

In the above list it will be noted that the U.S. patent to Cantoni and the European patent are the same invention and thus these references would be regarded as cumulative. Likewise, the United Kingdom patent reference is the same as the Italian patent reference and thus these two references are as well cumulative. It would also be pointed out that the United Kingdom reference would provide an adequate translation for the Italian reference.

Looking more specifically to these listed references, and in particular the United Kingdom reference (860,871), it should be noted that the disclosed device claims to increase the restriction across the full flow element by creating an annular area between the outer diameter of the bypass tube and the outlet of the full flow element. The restriction created across the full flow element is felt on the outside of the bypass element, therefore forcing additional fluid through the higher restriction bypass media. Artificially increasing the pressure drop across the filter will reduce the effective life of the filter. An increased restriction can cause a number of problems and thus this design while not regarded as particularly relevant to the present invention is also not comparable in its value and benefit. If there is a bypass valve present in the system, increased pressure drop could induce premature bypassing of the filter, resulting in contaminated fluid reaching the engine. If a bypass valve is not present, the increased restriction could result in reduced fluid flow to the engine which could result in engine failure. Additionally, any increase in pressure drop increases the parasitic loss of power from the pump. This loss of power reduces system efficiency and is therefore undesirable. In the present invention, there is not any type of significant increase in the pressure difference across the full flow filtering element. Instead, the design of the present invention relies on the reduced pressure zone to create a suction effect to draw the oil through the bypass filtering element.

The listed United Kingdom reference additionally claims the use of a frustoconical nozzle to create a lower pressure zone at the outlet of the bypass media. This reference relies on the main flow around the outside of the frustoconical nozzle to create a reduction of pressure inside the bypass filtering element. Expanding the flow around the nozzle is not the most efficient way to create a low pressure zone. The present invention forces all the outlet oil through a nozzle therefore increasing the velocity and creating a low pressure area. Venturi nozzles are noted for creating a high velocity increase with a low energy loss. This design allows for the maximum use of the existing flow to create a low pressure zone at the outlet of the bypass filtering element.

The patents issued to Cantoni, Wada and Kennedy appear to disclose the use a nozzle to create a flow through the bypass media. However, each of these designs provide an outlet for the bypass filtering element into the wall of the nozzle. By outletting the oil into the wall, the flow has to overcome the existing wall forces. The disclosed invention increases the efficient use of the nozzle by positioning the outlet of the bypass filtering element directly into the center of the flow. Due to the before mentioned wall forces, the velocity is at its greatest in the center of the flow therefore the pressure is at its lowest. This allows the maximum use of the velocity profile. Additionally, inserting the outlet into the center of the flow allows for greater cross sectional area than possible when outletting through the wall of the nozzle. The increased area allows for greater flow through the bypass filtering element. Consequently, the present invention is more efficient than any of the previously proposed designs and is neither anticipated by nor obvious in view of any of these listed patent references.

Although the present invention is detailed and described by reference to oil filtration for an internal combustion engine, it should be stressed that the teachings of the present invention are applicable to virtually any type of fluid, including air. Further, the bypass filtering element disclosed herein may alternatively be a chemically treated element which introduces beneficial chemicals into the oil or other fluid, without the need for a specific "bypass" flow.

SUMMARY OF THE INVENTION

A combined full flow and bypass oil filter for filtering the oil of an internal combustion engine according to one embodiment of the present invention comprises a filter body, a filter head assembled to the filter body and having a flow inlet and a flow outlet wherein the assembled combination of the filter head and filter body creates a flow path from the flow inlet to the flow outlet through the filter body, a full flow filtering element disposed in the filter body and positioned within the flow path, a bypass filtering element disposed in the filter body and positioned within the flow path and including an outlet flow conduit having an exit opening and a flow nozzle positioned in the flow path and arranged relative to the full flow filtering element and the bypass filtering element such that oil flow passing through the filtering elements to the flow outlet passes through the flow nozzle, the flow nozzle being arranged to create a low pressure zone and the exit opening of the outlet flow conduit being positioned in the low pressure zone.

One object of the present invention is to provide an improved full flow and bypass oil filter.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
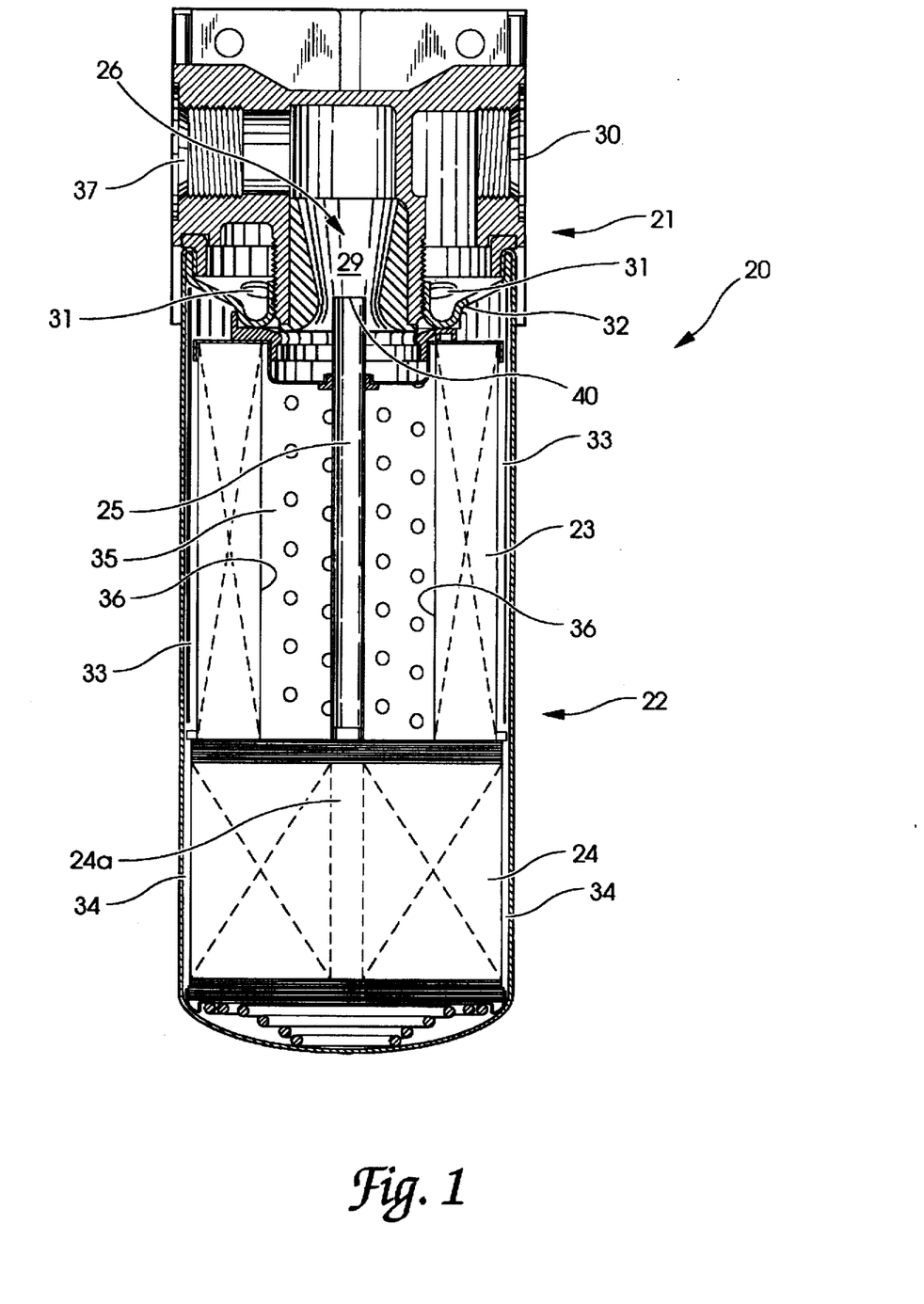
FIG. 1 is a side elevational view in full section of a combined full flow and bypass oil filter according to a typical embodiment of the present invention.

Referring to FIG. 1 there is illustrated as a front elevational view in full section a combined full flow and bypass oil filter 20. Oil filter 20 includes a generally cylindrical filter head 21, a generally cylindrical filter body 22, full flow filtering element 23 and bypass filtering element 24. Each filtering element is generally cylindrical and hollow and each has an outside diameter inlet side and an inside diameter outlet side. The bypass filtering element 24 is in flow and cooperation with an outlet conduit 25 which extends upwardly and concentrically into nozzle 26. Nozzle 26 has a generally cylindrical outer wall surface and an interior shape which includes a narrow throat 29. The bypass filtering element 24 is designed such that all exiting flow through its generally cylindrical open center 24a is directed into outlet conduit 25.

While there are four primary Bernoulli obstruction-type nozzle designs, the Venturi nozzle type has been used in styling the interior shape of nozzle 26. The other three primary types include (a) thin-plate orifice, (b) long radius nozzle and (c) the Dall nozzle.

Oil flow enters via internally threaded inlet aperture 30 and the oil is allowed to encircle the exterior of filtering elements 23 and 24 via the series radially spaced, circular openings 31 in top plate 32 and via outer clearance regions 33 and 34. The oil which flows through filtering element 23 passes into the inner cylindrical void 35 defined by the inner cylindrical wall 36 of filtering element 23. The exiting flow of this filtered oil passes entirely through nozzle 26 and from there through internally threaded outlet aperture 37.

As illustrated in FIG. 1, the narrow throat 29 of nozzle 26 is axially (radially) symmetrical and concentric relative to nozzle 26. Nozzle 26 is concentric with generally cylindrical filtering elements 23 and 24, filter head 21, filter body 22 and outlet conduit 25 which are likewise generally concentric to each other. The upper open end 40 of outlet conduit 25 is positioned within the narrow throat 29 of nozzle 26 coincident with the location of the smallest inside diameter. Nozzle 26 utilizes the full flow of oil via filtering element 23 to create both a high speed flow area and a low pressure zone. The open end 40 of outlet conduit 25 is placed in the low pressure zone. The two filtering elements 23 and 24 share the common inlet aperture 30 resulting in a common upstream pressure zone. However, due to the placement of the outlet conduit 25 in the narrow throat 29, the bypass filtering element 24 has a lower downstream pressure than that of the full flow filtering element 23. The pressure differential across filtering element 24 is greater than that across filtering element 23 causing more oil flow to be drawn through the bypass filtering element 24 than what would otherwise exist for similar filters which do not have the nozzle design of the present invention. The desired flow rate of oil through bypass filtering element 24 can be varied and controlled by the design and dimensions of the nozzle 26, narrow throat 29 and outlet conduit 25. Nozzle 26 includes a divergent section which defines a flow passage. The flow passage diverges in the direction of outlet aperture 37.

In the FIG. 1 design the nozzle 26 is an integrally assembled part of the filter head 21. The bypass filtering element outlet conduit 25 is placed in the filter body and after assembly of the filter head to the filter body, the outlet conduit 25 is positioned in the narrow throat of the nozzle. Although the outlet conduit 25 and nozzle 26 are separate components in the FIG. 1 illustration, they are specifically designed as a working unit to ensure optimum performance.

While the bypass filtering element 24 has been described as an actual filtering element, it is envisioned that it may alternatively be structured as a source of supply for a treatment chemical. While the fluid to be treated would still in all likelihood pass through or over this chemically-treated element, it would treat the fluid more by the addition of one or more chemical additives and less by actual mechanical filtering. It should also be understood that the fluid passing through filter 20, whether oil or some other fluid, is "treated" whether being filtered to remove dirt and contaminants or by adding one or more chemical additives, or both.

Figure 2:
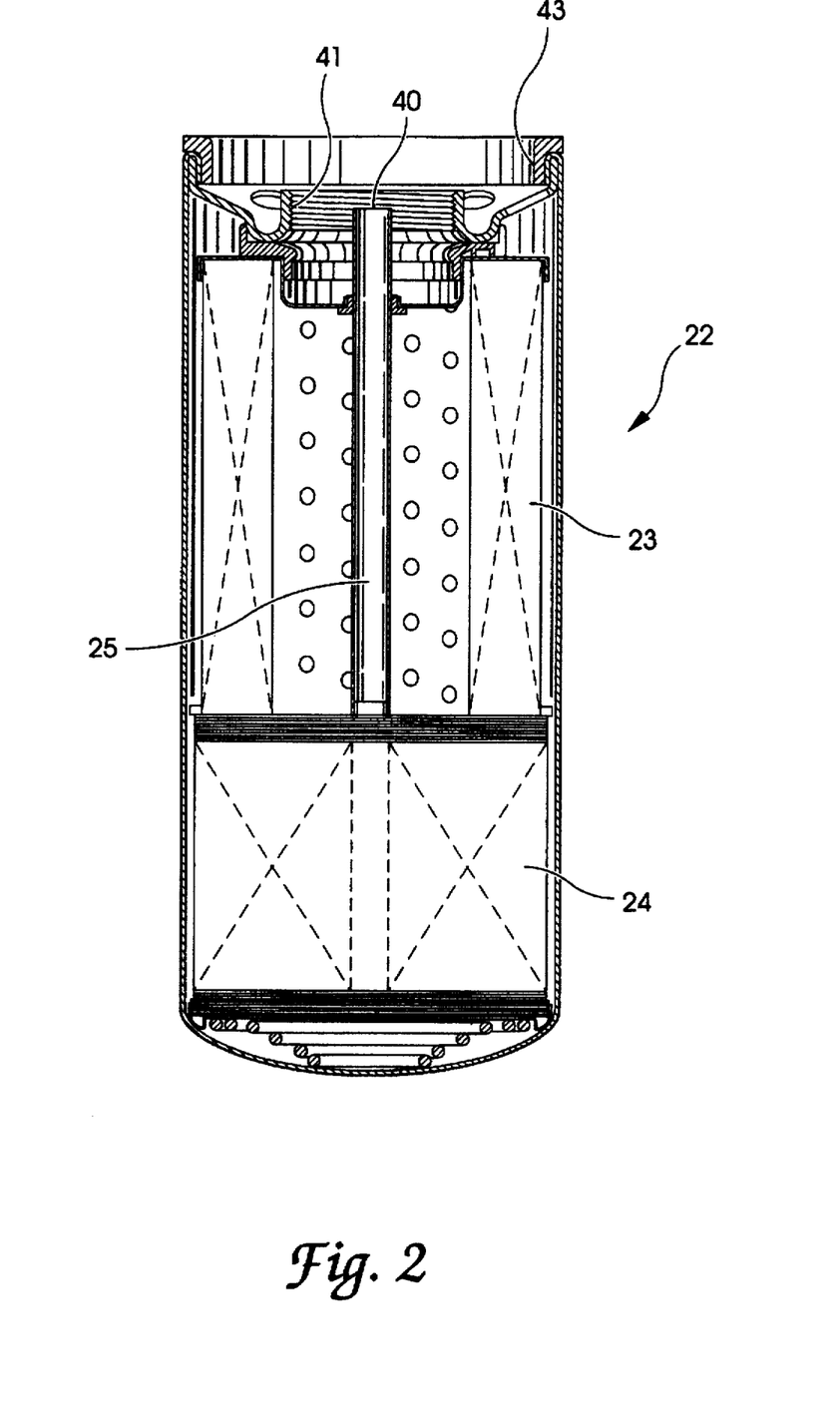
FIG. 2 is a side elevational view in full section of the filter body of the FIG. 1 oil filter.
Figure 3:
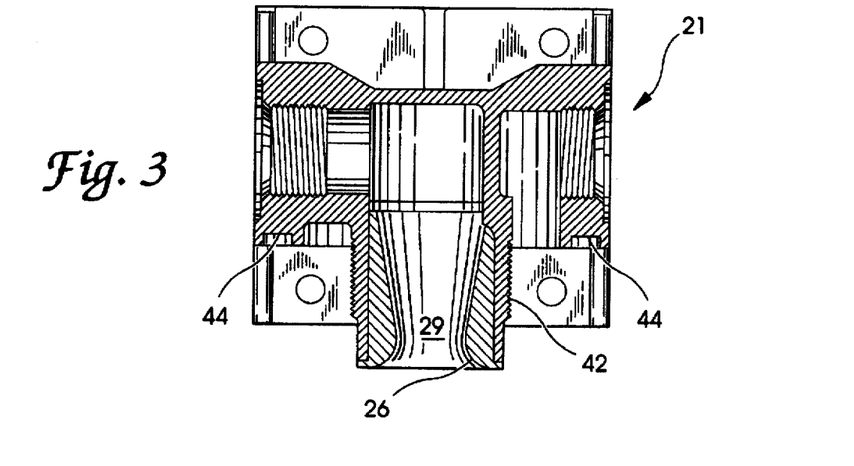
FIG. 3 is a side elevational view in full section of the filter head of the FIG. 1 oil filter.

FIG. 2 illustrates details of the FIG. 1 filter body 22 without the filter head 21. The FIG. 1 filter head 21 is likewise separately illustrated in FIG. 3. Internally threaded sleeve 41 in filter body 22 is designed and arranged to receive by threaded engagement the externally threaded sleeve 42 in filter head 21. As this assembly is completed annular seal 43 fits snugly up into annular channel 44.

Figure 4:
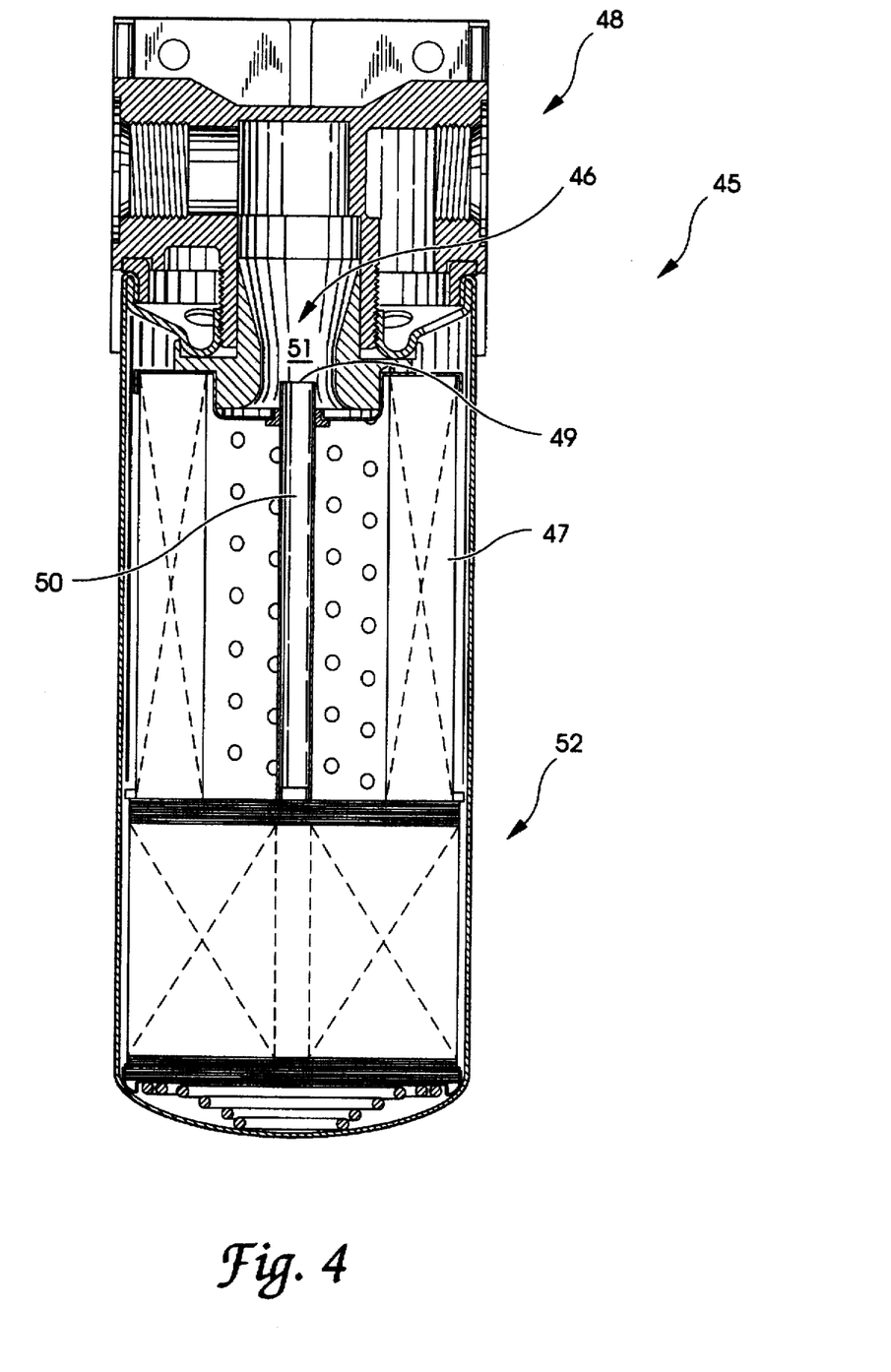
FIG. 4 is a side elevational view in full section of a combined full flow and bypass oil filter according to a typical embodiment of the present invention.
Figure 5:
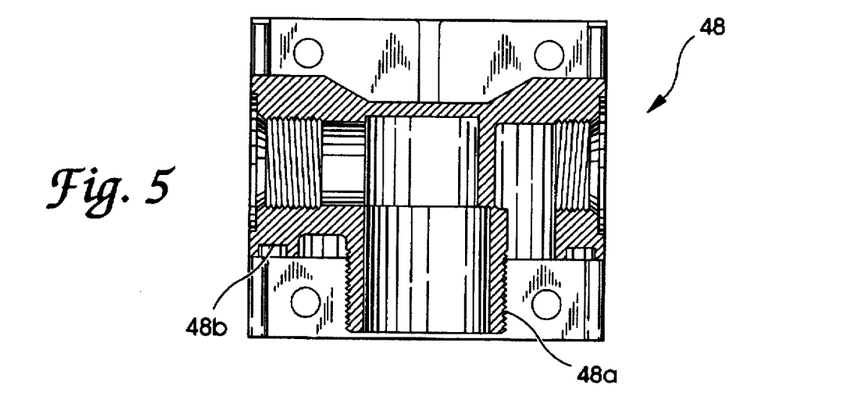
FIG. 5 is a side elevational view in full section of the filter head of the FIG. 4 oil filter.
Figure 6:
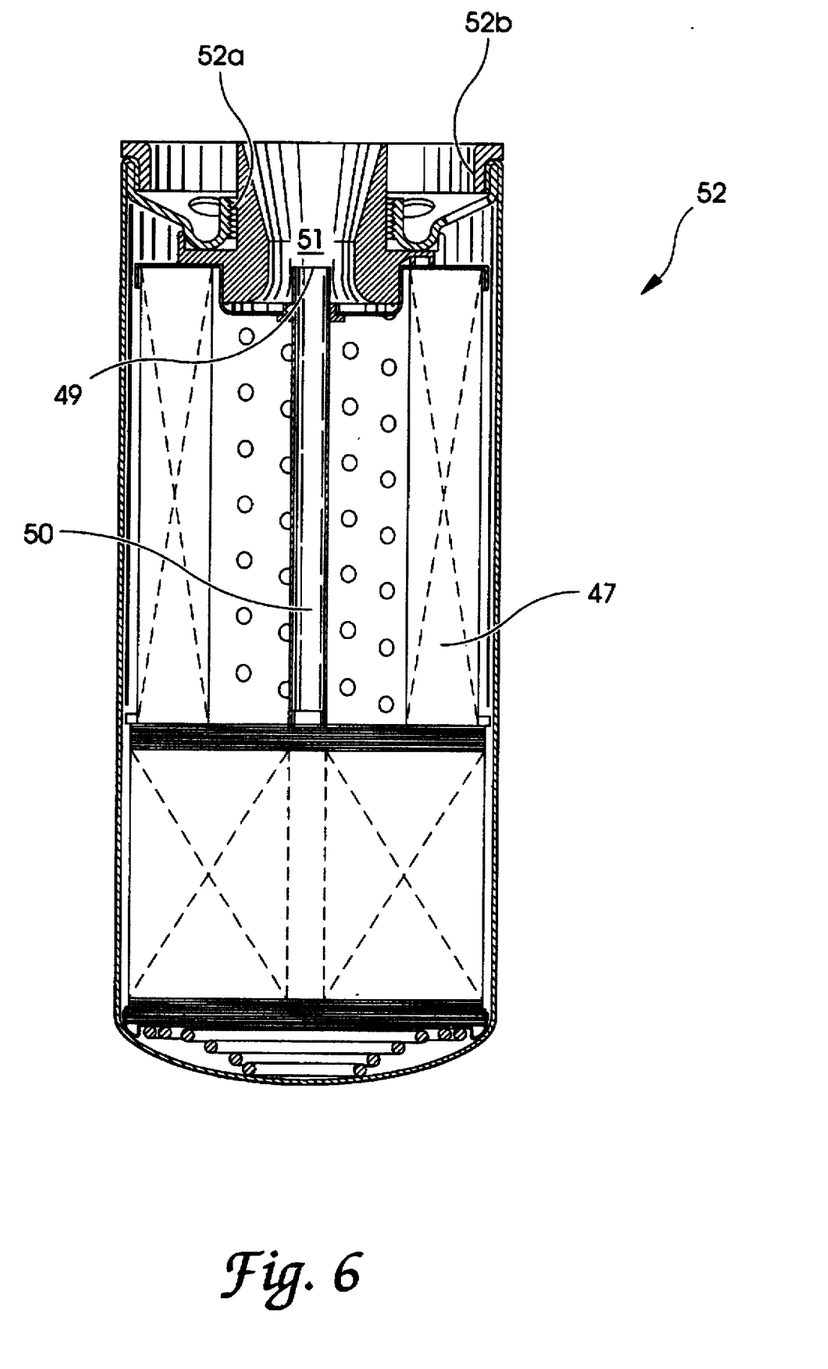
FIG. 6 is a side elevational view in full section of the filter body of the FIG. 4 oil filter.

Referring to FIG. 4 another dual filtering element oil filter 45 according to the present invention is illustrated. While this oil filter operates and performs in a manner which is virtually identical to oil filter 20, there is one primary difference. In the FIG. 4 design the nozzle 46 is incorporated as part of the filter body and the full flow filtering element 47 rather than being part of the filter head 48. The critical differences in upstream and downstream pressures across the two filtering elements is maintained by the fixed positioning of the open end 49 of the outlet conduit 50 relative to the nozzle throat 51. Nozzle 46 includes a divergent section which defines a flow passage. The flow passage diverges in the direction of the corresponding outlet aperture. FIG. 5 details the design of the filter head 48 as a separate component from the remainder of filter 45. FIG. 6 details a design of the filter body 52 as a separate component from the filter head 48. The filter head 48 and filter body 52 are assembled by the threaded engagement of sleeve 52a in the filter body with sleeve 48a in the filter head. Annular seal 52b fits snugly up into annular channel 48b.

Figure 7:
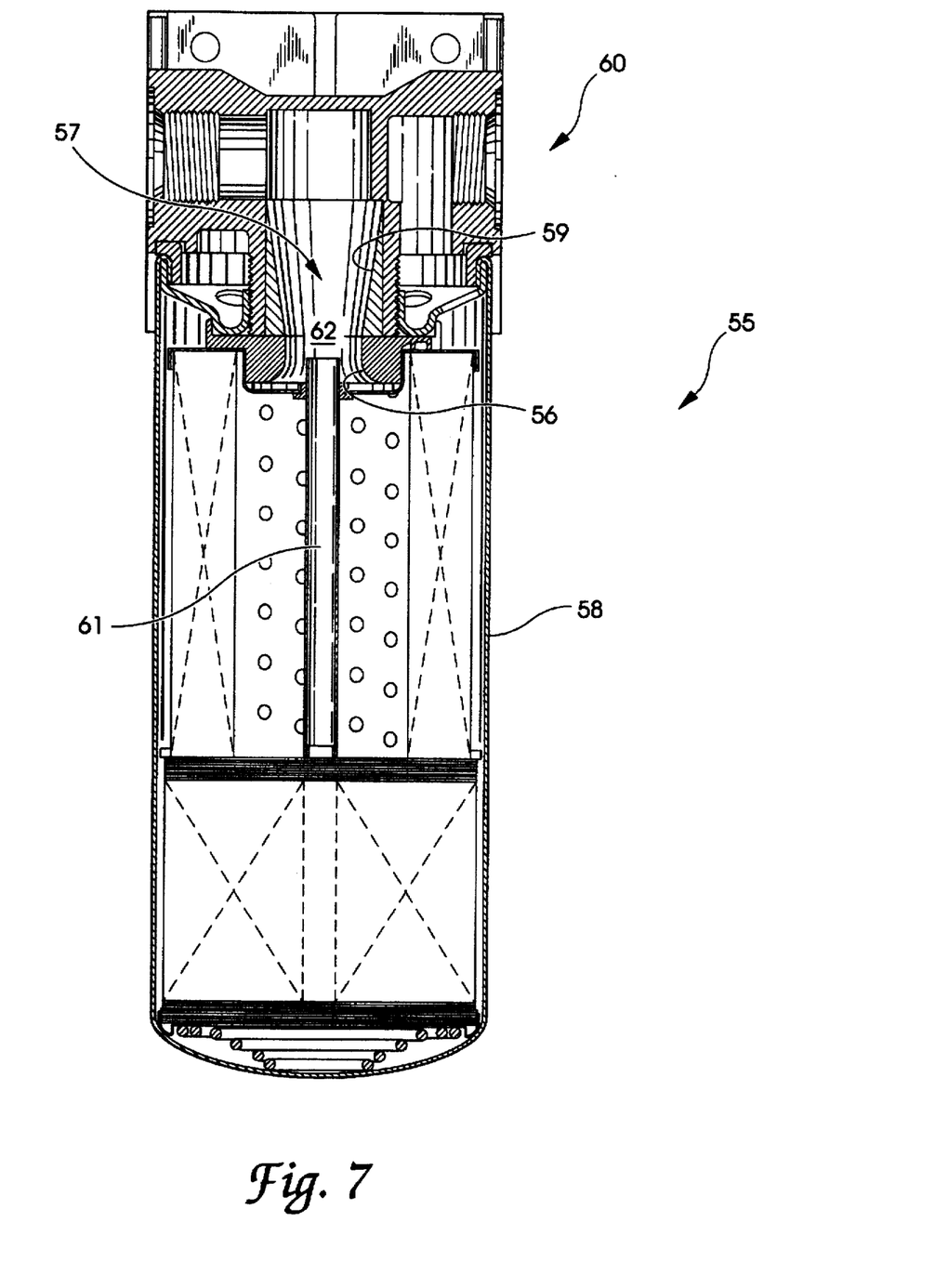
FIG. 7 is a side elevational view in full section of a combined full flow and bypass oil filter according to a typical embodiment of the present invention.
Figure 8:
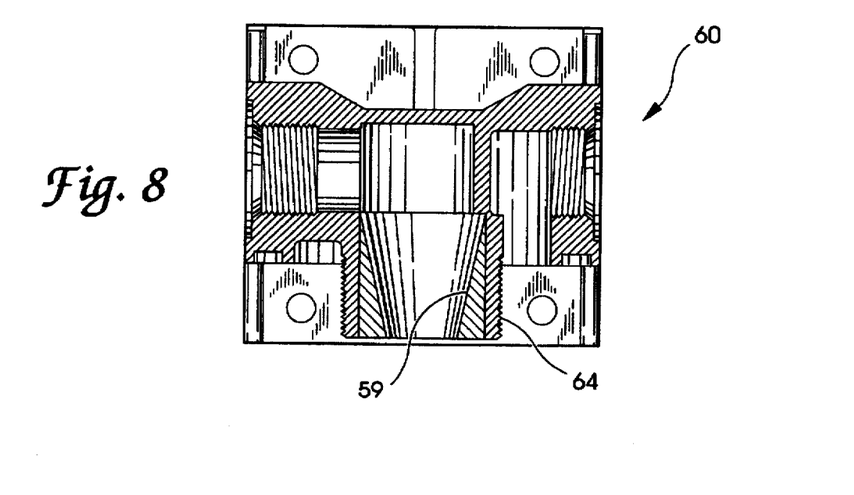
FIG. 8 is a side elevational view in full section of the filter head of the FIG. 7 oil filter.
Figure 9:
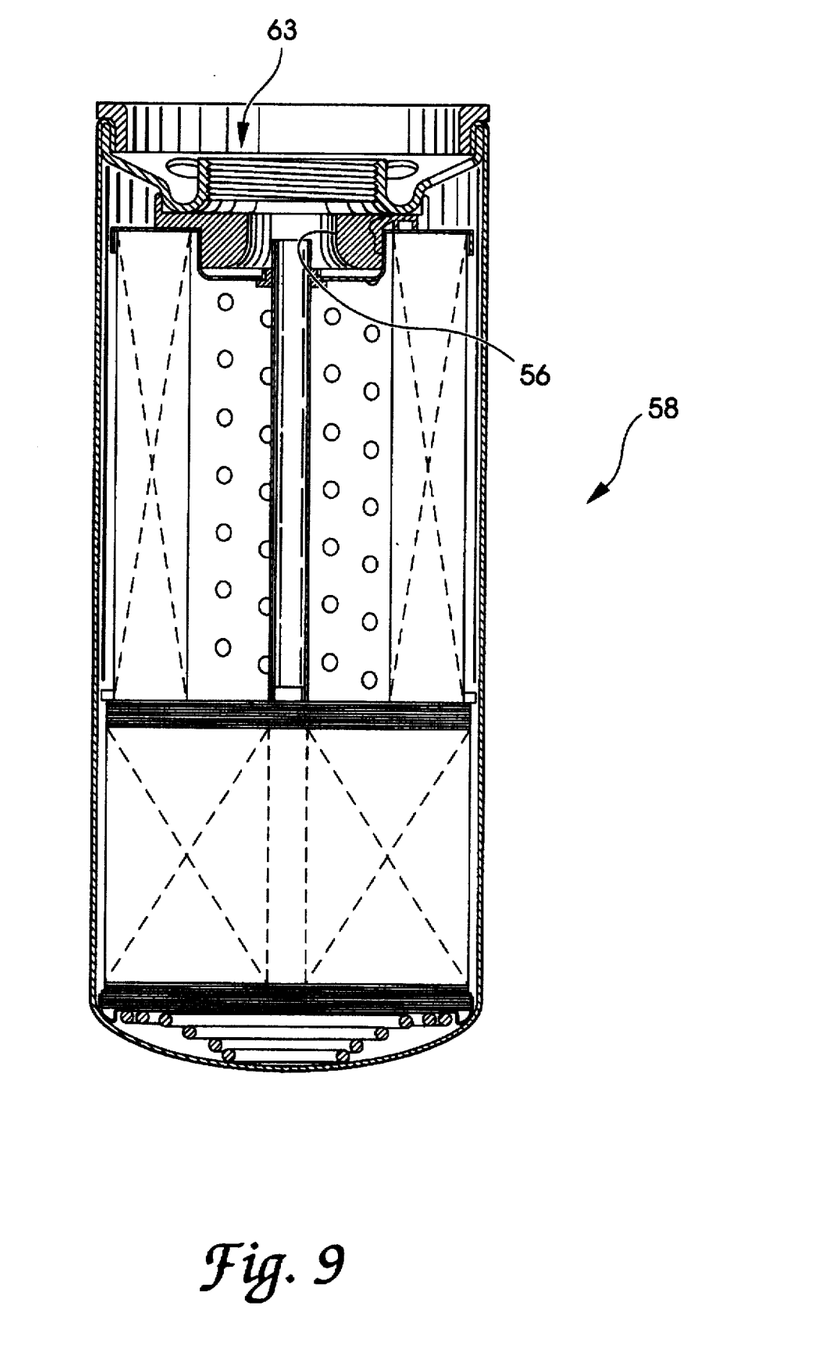
FIG. 9 is a side elevational view in full section of the filter body of the FIG. 7 oil filter.

Referring to FIG. 7 another oil filter 55 according to the present invention is illustrated. In the FIG. 7 design a portion 56 of the nozzle 57 is built into the filter body 58 and a mating portion 59 is built into the filter head 60. The relative positions of the bypass outlet conduit 61 and nozzle throat 62 are or become fixed with the threaded engagement assembly of the filter head 60 onto the filter body 58. The FIG. 7 filter assembly operates and performs in a manner which is virtually identical to that of oil filter 45 as well as to that of oil filter 20. Nozzle 57 includes a divergent section which defines a flow passage. The flow passage diverges in the direction of the corresponding outlet aperture. The filter head 60 is separately illustrated in FIG. 8 and the filter body 58 is separately illustrated in FIG. 9. In FIG. 9 an internally threaded, central aperture 63 is disposed concentrically to and directly above nozzle portion 56. In FIG. 8 an externally threaded sleeve 64 surrounds and receives mating nozzle portion 59. Sleeve 64 and nozzle portion 59 may be cast as a single, integral unit. It is the threaded engagement of sleeve 64 and aperture 63 that completes and creates nozzle 57 and completes the assembly of oil filter 55.

Figure 10:
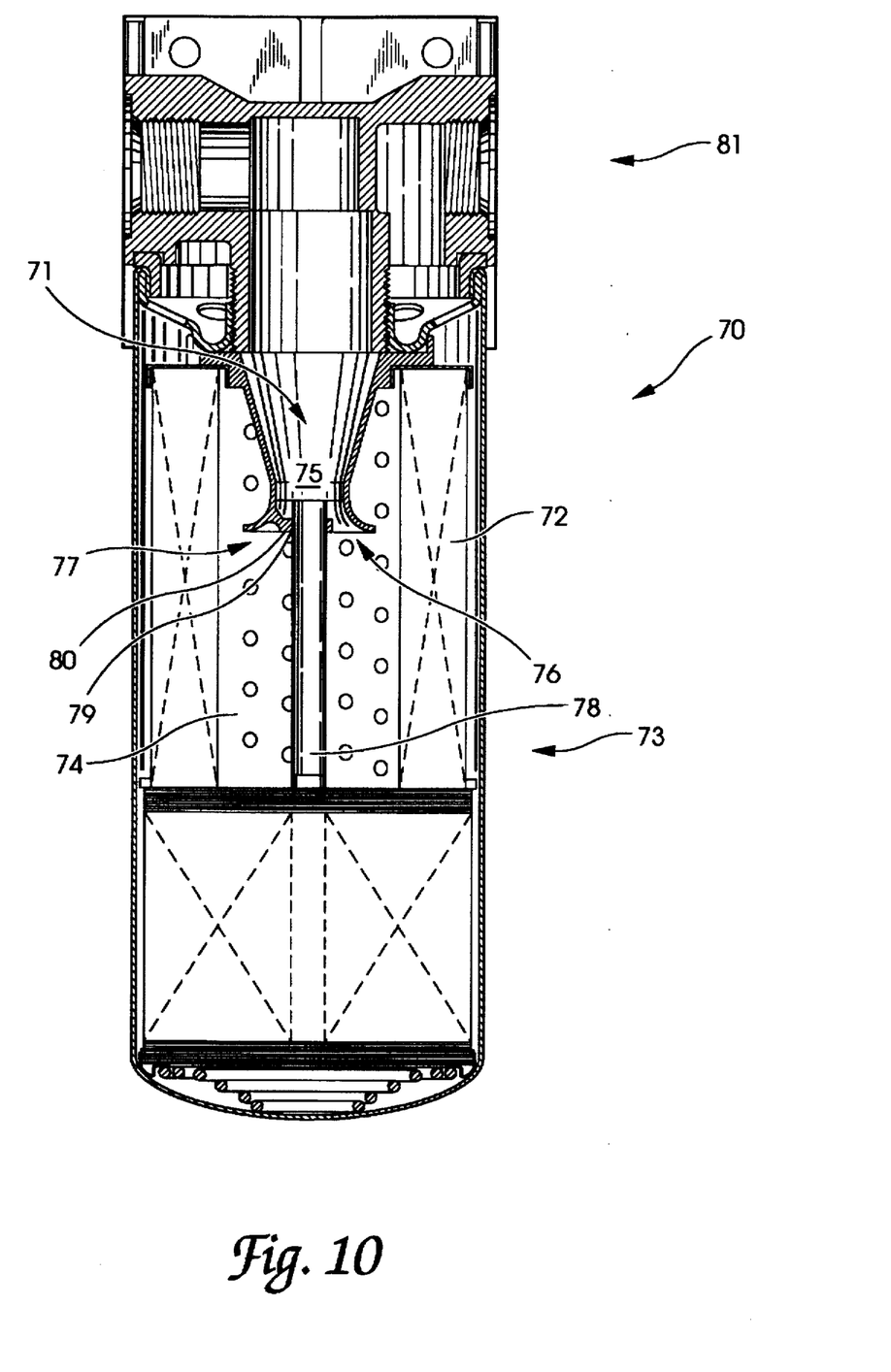
FIG. 10 is a side elevational view in full section of a combined full flow and bypass oil filter according to a typical embodiment of the present invention.

Referring now to FIG. 10 there is illustrated an oil filter 70 the design of which is based primarily on the filter head and filter body design of FIG. 4 with the exception that the nozzle design is different. In FIG. 10 the nozzle 71 fits atop the full flow filtering element 72, within and as a part of filter body 73. Nozzle 71 extends downwardly into the hollow, generally cylindrical interior 74 of element 72 and is arranged so as to be concentric therewith. Nozzle 71 includes a reduced diameter throat 75 and the lower most portion (inlet) 76 of the nozzle includes an integral centering device 77. Nozzle 71 includes a divergent section which defines a flow passage. The flow passage diverges in the direction of the corresponding outlet aperture.

Centering device 77 as incorporated in the nozzle inlet 76 receives the bypass outlet conduit 78. This conduit 78 fits up into aperture 79 formed in shelf portion 80. The centering device 77 controls the concentric centering and longitudinal positioning of the outlet conduit in the low pressure zone of the nozzle 71.

Figure 11:
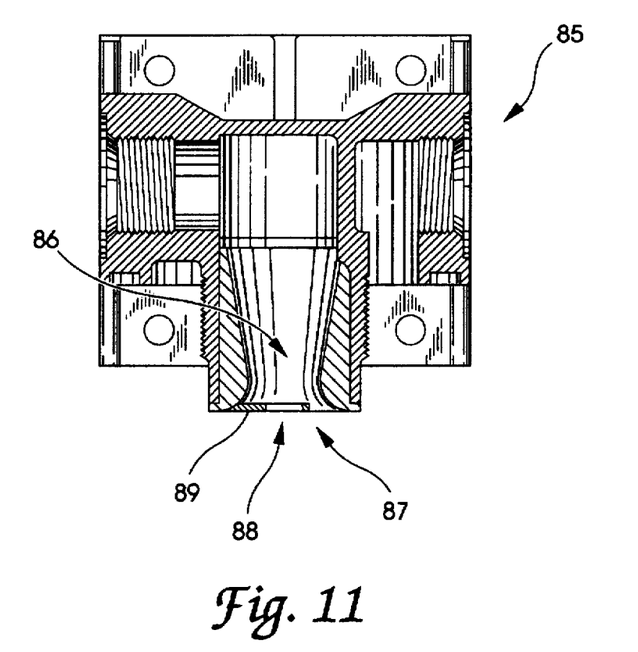
FIG. 11 is a side elevational view in full section of a filter head suitable for use with the FIG. 2 filter body according to the present invention.
Figure 11A:
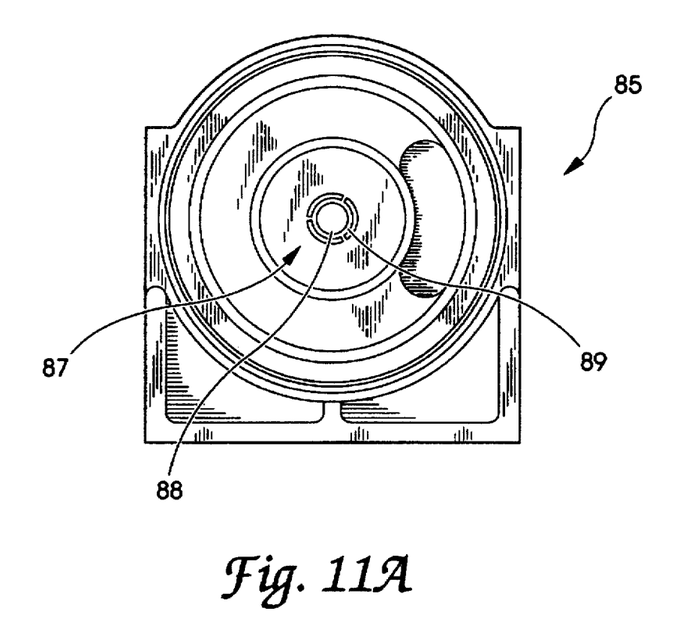
FIG. 11A is a bottom plan view of the FIG. 11 filter head.

Referring to FIG. 11 another head design 85 according to the present invention is illustrated. Head 85 including centering device 87 may be used in conjunction with the FIG. 2 oil filter body wherein the centering device 87 (aperture 88 and shelf portion 89) is added to the inlet of the nozzle. FIG. 11A is a bottom plan view of the FIG. 11 filter head 85, illustrating the structural details of centering device 87.

Figure 12:
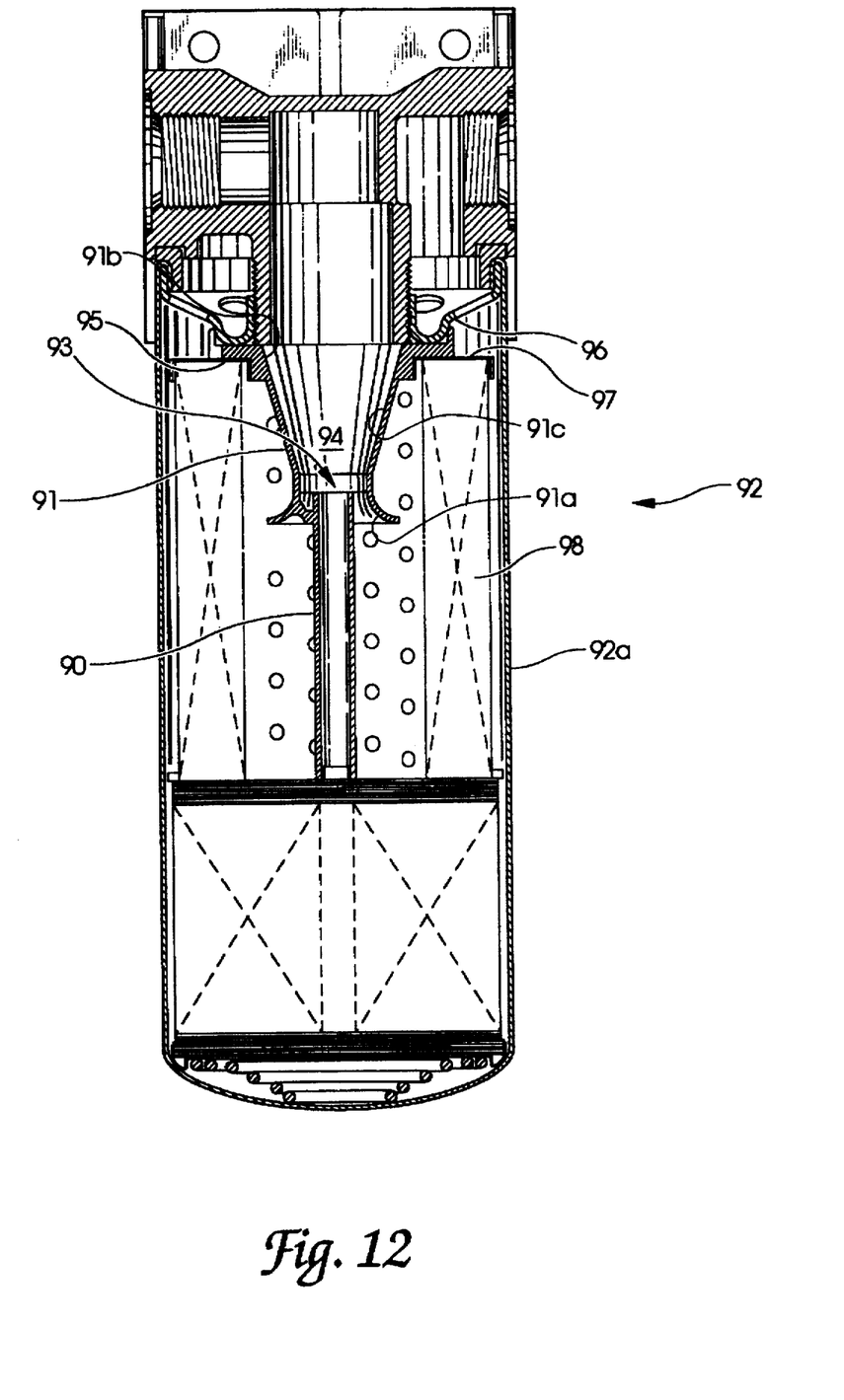
FIG. 12 is a front elevational view in full section of a combined full flow and bypass oil filter according to a typical embodiment of the present invention.

A further variation to what is illustrated in FIG. 10 as now illustrated in FIG. 12 is to remove the centering device 77 and make the bypass outlet conduit 90 an integral extension of nozzle 91 in oil filter 92. By combining the bypass outlet conduit 90 and nozzle 91 as a single, integral component part, optimal location of the outlet 93 of conduit 90 and the low pressure zone 94 of the nozzle is ensured. This particular design also reduces the number of components and simplifies the design and assembly of oil filter 92. Nozzle 91 includes a divergent section which defines a flow passage. The flow passage diverges in the direction of the corresponding outlet aperture. This specific arrangement may be used with the filter head and filter body configurations of FIGS. 4, 7, and 10.

Oil filter 92 includes an outer shell 92a which receives both filtering elements. Outlet conduit 90 extends into the hollow interior of the full flow filtering element 98 in the direction of nozzle 91. Nozzle 91 which is positioned entirely within the filter body includes a flow entrance 91a and a flow exit 91b and a divergent section 91c is positioned therebetween.

Another option for the structures of FIGS. 4, 7, 10 and 12 is to configure the nozzle, such as 91 in FIG. 12 and in particular its radial flange (95 in FIG. 12) so as to create fluid-tight sealed surfaces at the interfaces between the nutplate (96 in FIG. 12) and the endplate (97 in FIG. 12) of the full flow filtering element 98. The function of this sealing is to prevent the passage of oil from the inlet to the outlet of the oil filter 92 without first going through the filtering media of filter 92. The advantage of incorporating the required seal as part of the nozzle is the elimination of a separate sealing component.

Figure 13:
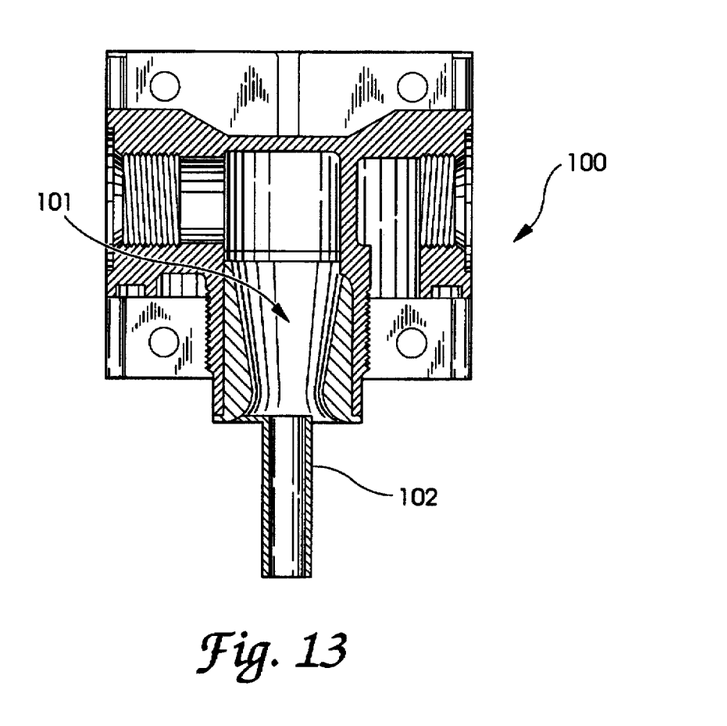
FIG. 13 is a side elevational view in full section of an alternative filter head design according to the present invention.
Figure 13A:
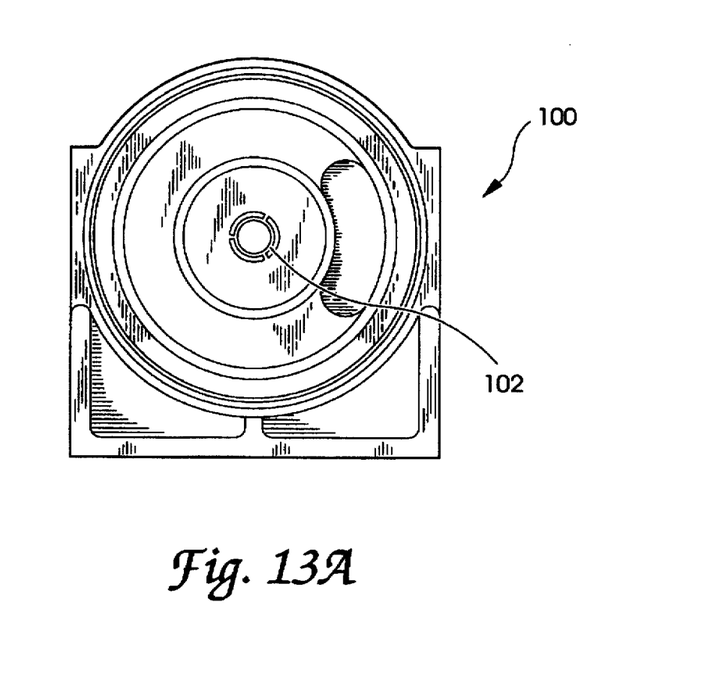
FIG. 13A is a bottom plan view of the FIG. 13 filter head.

A still further variation to the integral bypass outlet conduit of FIG. 12 is to make this conduit a permanent and integral part of the filter head as illustrated in FIG. 13. In FIG. 13 filter head 100 includes nozzle 101 and bypass conduit 102 which is an integral part of the nozzle. FIG. 13A is a bottom plan view of the FIG. 13 filter head 97.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combined full flow and bypass oil filter comprising:

a housing having a closed end and an open end;

a cover for closing the open end of said housing, wherein said cover includes an outlet opening;

a full flow filtering element positioned within said housing proximate said cover, wherein said full flow filtering element includes a hollow central core for receiving filtered oil, a first end positioned proximate said cover, and a second end positioned distal of said cover;

a bypass filtering element positioned within said housing between the closed end of said housing and the second end of said full flow filtering element, wherein said bypass filtering element includes means defining a filtered oil outlet adjacent the second end of the full flow filtering element;

inlet means for delivering oil into said housing;

a unitary venturi nozzle including a first open end fluidly connected with the outlet opening of said cover and a second open end positioned within the hollow central core of said full flow filtering element, said venturi nozzle having a flow channel extending between said first and second open ends thereof, said flow channel including a first flow section of a first cross sectional flow area, a second flow section that converges from a second cross sectional flow area at said second open end to said first flow section, and a third flow section that diverges from said first flow section to a third cross sectional flow area at the first open end; and conduit means extending axially from said filtered oil outlet of said bypass filtering element to the first section of said flow channel via the hollow central core of said full flow filtering element such that oil flowing through said venturi nozzle from said full flow filtering element to said outlet opening creates a low pressure zone at said first flow section facilitating the draw of oil through said bypass filtering element via said conduit means.

2. The oil filter of claim 1 wherein said venturi nozzle and said conduit means are arranged as a single, integral component.

3. The filter of claim 1 wherein said Venturi nozzle includes a centering device for said conduit means.

\* \* \* \* \*